United States Patent
Chin

[11] Patent Number: 5,561,414
[45] Date of Patent: Oct. 1, 1996

[54] BICYCLE WARNING SIGNAL CONTROL DEVICE

[75] Inventor: Min-Yu Chin, Fentuan, Taiwan

[73] Assignee: Yu Hsiang Chiu Enterprise Co., Ltd., Fenyuan, Taiwan

[21] Appl. No.: 392,324

[22] Filed: Feb. 22, 1995

[51] Int. Cl.$^6$ ............................................. B62J 3/00
[52] U.S. Cl. ..................... 340/432; 340/463; 340/331; 362/72; 362/802
[58] Field of Search ..................... 340/432, 429, 340/463, 467, 479, 321, 331; 362/72, 157, 276, 802

[56] References Cited

U.S. PATENT DOCUMENTS

| | | | |
|---|---|---|---|
| 3,840,853 | 10/1974 | Cukale | 340/432 |
| 4,019,171 | 4/1977 | Martelet | 362/72 |
| 4,323,879 | 4/1982 | Kelley | 340/432 |
| 4,860,177 | 8/1989 | Simms | 340/432 |
| 4,949,228 | 8/1990 | Lin et al. | 340/432 |
| 4,967,179 | 10/1990 | Solini | 340/432 |
| 5,247,280 | 9/1993 | Incorvaia et al. | 340/463 |
| 5,313,188 | 5/1994 | Choi et al. | 340/432 |
| 5,418,697 | 5/1995 | Chiou | 362/72 |
| 5,446,441 | 8/1995 | Su | 340/432 |

Primary Examiner—Jeffery Hofsass
Assistant Examiner—Daniel J. Wu
Attorney, Agent, or Firm—Bacon & Thomas

[57] ABSTRACT

A bicycle warning signal control device including a light emitting control circuit mounted within a casing and installed in a mounting hole on the rear side of a saddle, the light emitting control circuit comprising a control IC connected to a DC power supply through a vibration switch and at least one lamp controlled by the control IC to give a flashing warning signal when the vibration switch is vibrated during the running of the bicycle.

7 Claims, 12 Drawing Sheets

BICYCLE WARNING SIGNAL CONTROL DEVICE

BACKGROUND OF THE INVENTION

The present invention relates to a bicycle warning signal control device which is mounted on the rear side of the saddle of a bicycle and controlled by a vibration switch to give a flashing warning signal when the bicycle is moving.

Regular bicycles are generally equipped with red or yellow color reflectors for reflecting light during the dark, so that they can give a warning signal to the vehicles coming from behind. However, reflectors will become ineffective during bad weather conditions, for example, during raining or when it is foggy. Nowadays, warning signal lamps are commonly used with bicycles for giving a warning signal. FIGS. 1 and 2 show a warning signal control device 10 according to the prior art, which is mounted on the bottom side of a bicycle saddle 20. The warning signal control device 10 comprises a casing 13 injection-molded from plastics and having a flange 11 fitting the bottom side of the saddle 20 and fixed to the saddle 20 by two screws 12, a battery set 15 and a light source 16 respectively mounted within two separate receiving chambers 14 inside the casing 13, and a lens 17 covered over the receiving chambers 14. The light source 16 comprises a circuit board 161, two lamp bulbs 162 mounted on the circuit board 161 and connected in series, and an ON/OFF switch 163 connected between the battery set 15 and the lamp bulbs 162. As this warning signal control device is controlled manually by an ON/OFF switch, it does no work if the bicycle rider forgets to turn on the ON/OFF switch.

SUMMARY OF THE INVENTION

The present invention has been accomplished under the circumstances in view. It is one object of the present invention to provide a bicycle warning signal control device which automatically gives a flashing warning signal when the bicycle is running. It is another object of the present invention to provide a warning signal control device which is designed to be mounted on the saddle of the bicycle to automatically give a flashing warning signal when the bicycle is running. It is still another object of the present invention to provide a bicycle warning signal control device which is impact and easy to install. According to one aspect of the present invention, the bicycle warning signal control device comprises a light emitting control circuit mounted within a casing and installed in a mounting hole on the rear side of a saddle, the light emitting control circuit comprising a control IC connected to a DC power supply through a vibration switch and at least one lamp controlled by the control IC to give a flashing warning signal when the vibration switch is vibrated during the running of the bicycle. According to another aspect of the present invention, the casing has a top side fixed with double-sided adhesive tape, which is adhered to the bottom side of the saddle when the casing is inserted into the mounting hole on the saddle.

DETAILED DESCRIPTION OF THE PREFERRED EMBODIMENT

Figure 1:
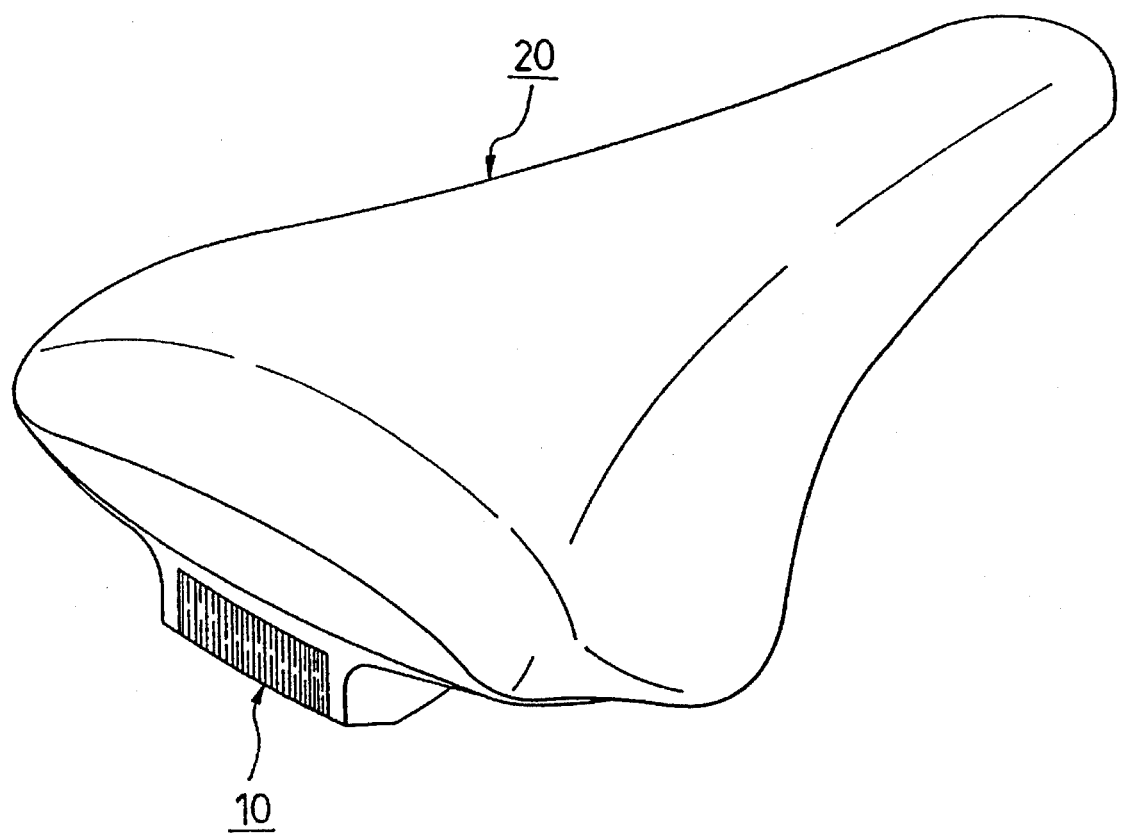
FIG. 1 shows a bicycle saddle with a warning signal control device according to the prior art.
Figure 2:
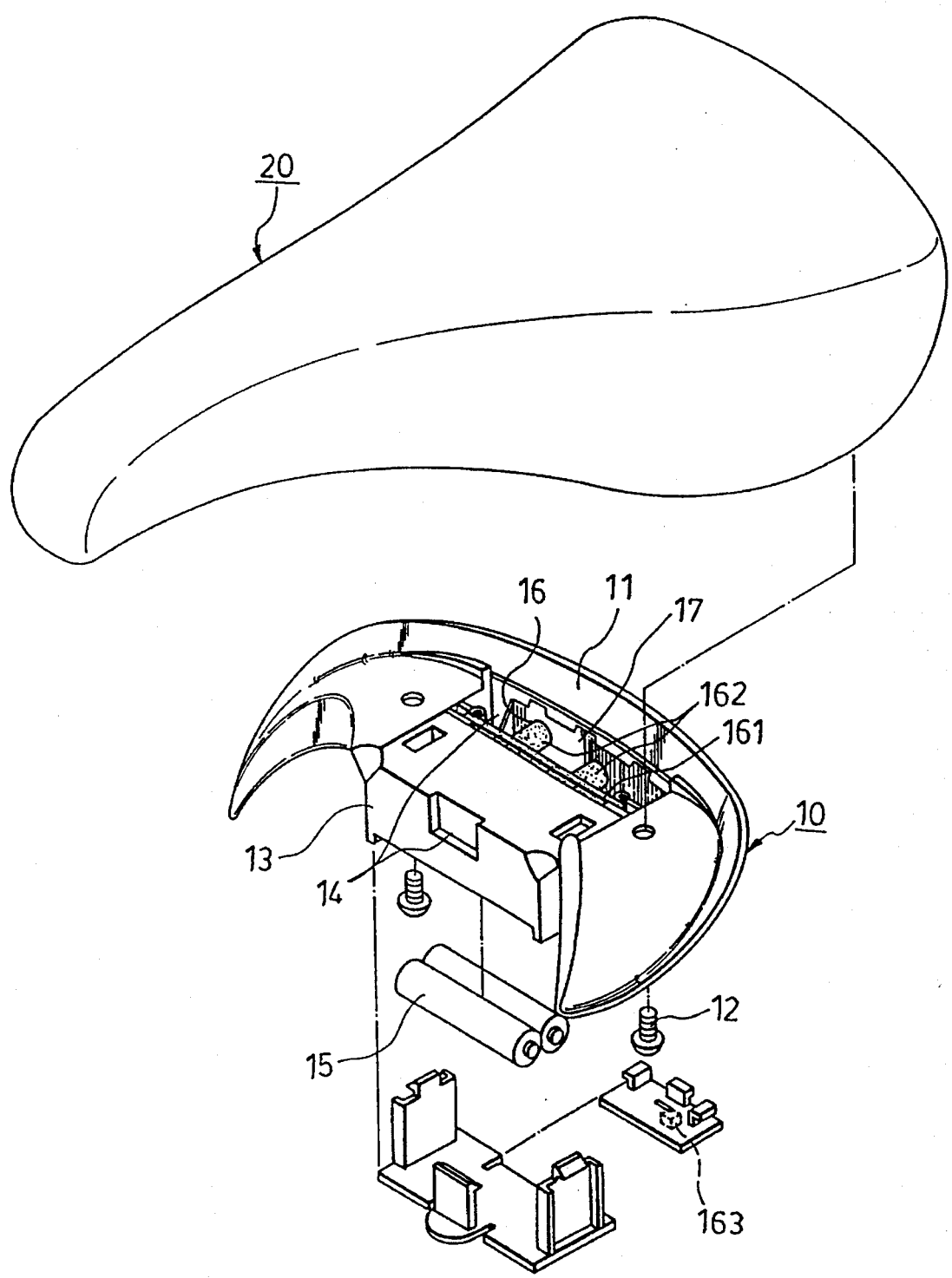
FIG. 2 is an exploded view of FIG. 1.
Figure 3:
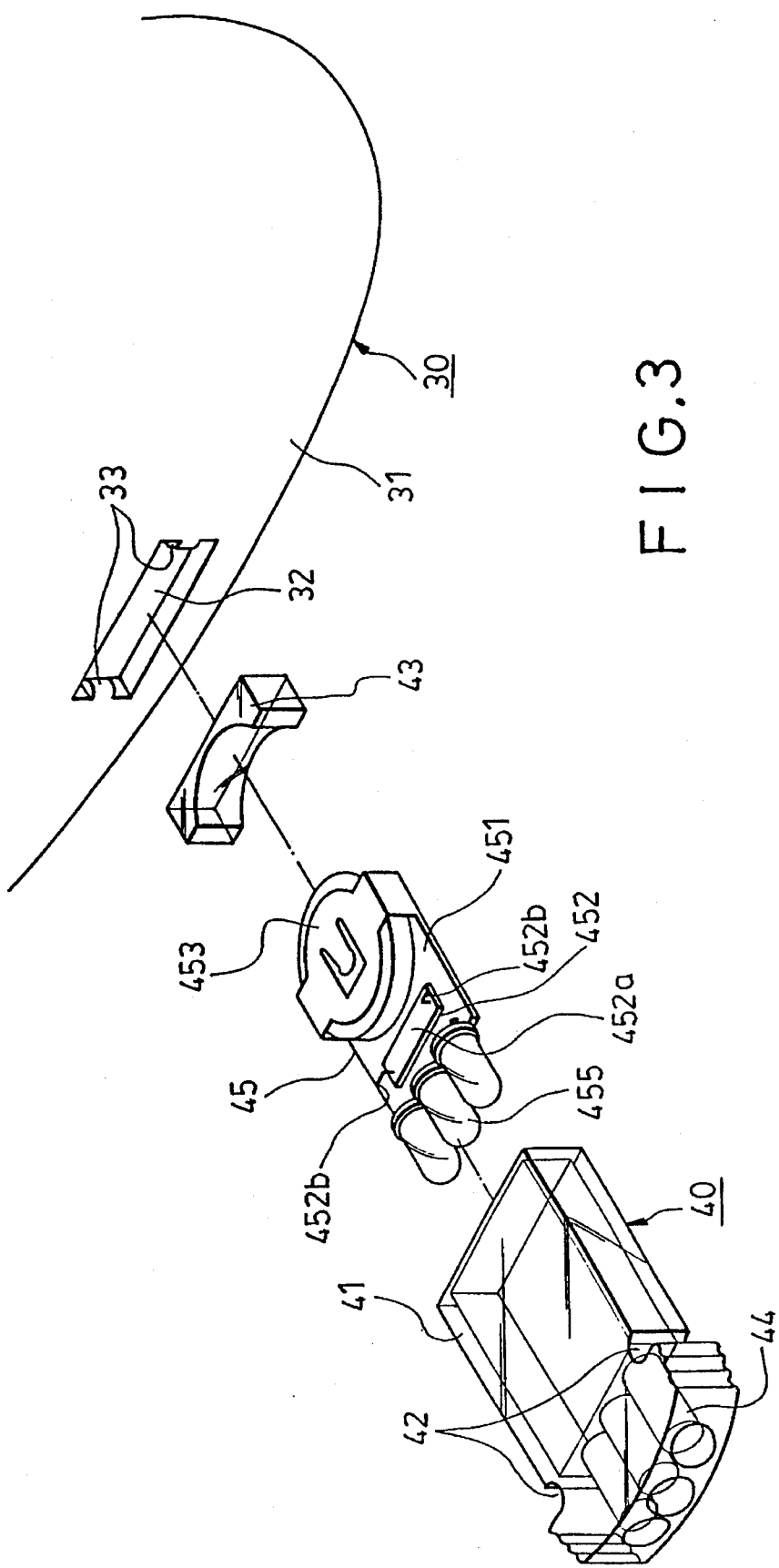
FIG. 3 is an exploded view of a bicycle warning signal control device according to the present invention.

Referring to FIG. 3, a bicycle warning signal control device in accordance with the present invention is generally comprised of a warning signal control unit 40 and a saddle 30. The saddle 30 has a mounting hole 32 on the rear side 31 thereof and two inward flanges 33 at two opposite sides within the mounting hole 32 for mounting the warning signal control unit 40. The warning signal control unit 40 comprises a casing 41 fitted into the mounting hole 32, and a light emitting control circuit 45 mounted within the casing 41 and covered by the rear cover 43. The casing 41 is covered with a rear cover 43 to hold the light emitting control circuit 45 on the inside, having two retaining holes 42 at two opposite lateral sides thereof respectively engaged with the inward flanges 33 and a plurality of lamp holes 44 at a front side thereof (opposite to the rear cover 43).

Figure 4:
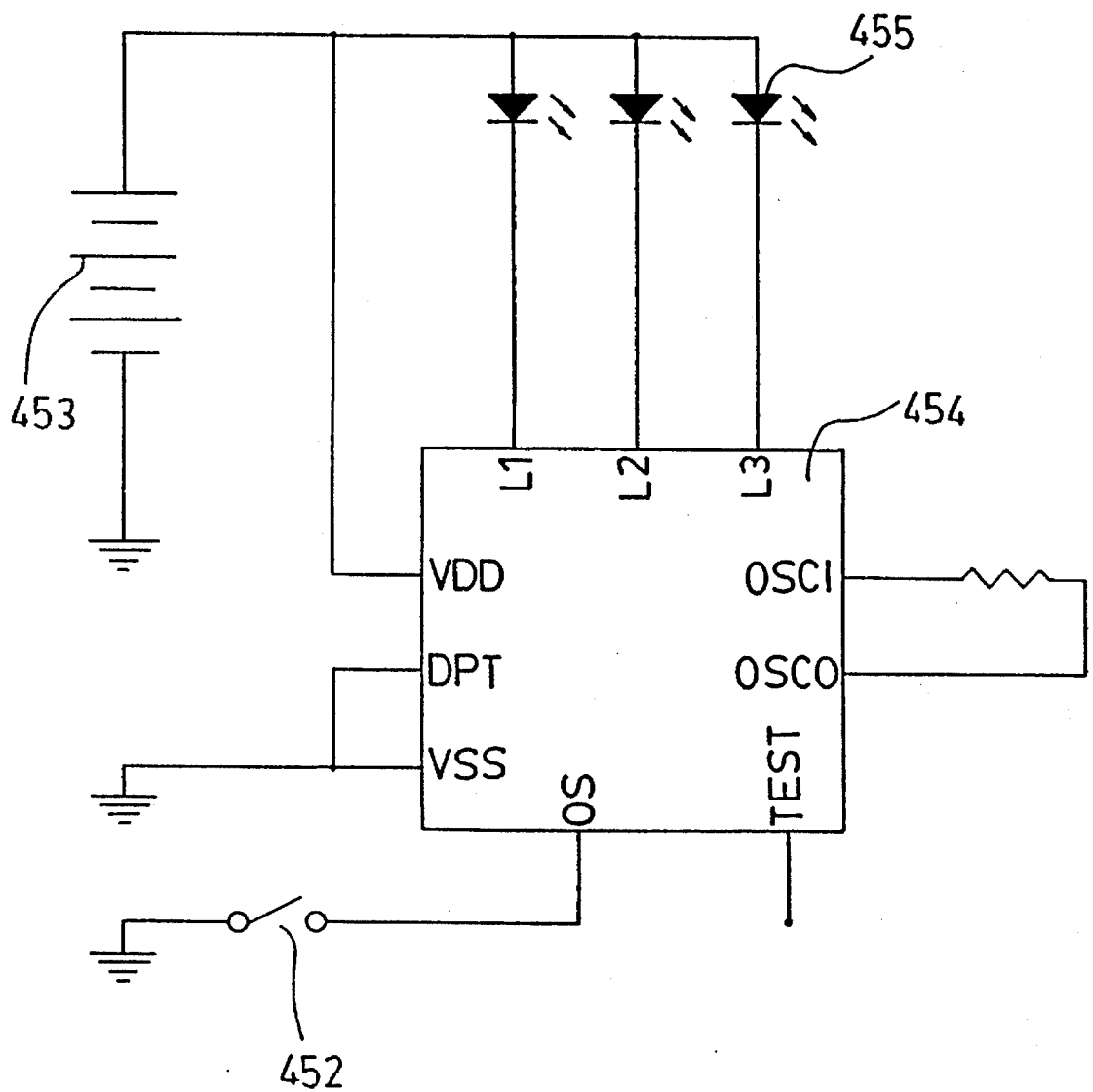
FIG. 4 is a circuit diagram of a light emitting control circuit according to the present invention.

Referring to FIG. 4 and FIG. 3 again, the light emitting control circuit 45 comprises a circuit board 451, a vibration switch 452 mounted on the circuit board 451 and comprised of a metal spring leaf 452a and two jumper wires 452b, a DC power supply 453, a control IC 454, and a plurality of lamps 455. When the light emitting control circuit 45 is installed in the casing 41, the lamps 455 are respectively inserted into the lamp holes 44. When the metal spring leaf 452a is oscillated to connect/disconnect the jumper wires 452b, the vibration switch 452 is switched on/off. The DC power supply 453 is connected to the control IC 454 through the vibration switch 452. The DC power supply 453 is preferably a 2032 lithium battery cell which meets common environmental protection requirements. The control IC 454 has three signal output legs L1, L2 and L3 respectively connected to the lamps 455 to control their operation. The lamps 455 are preferably of light emitting diodes.

Figure 5:
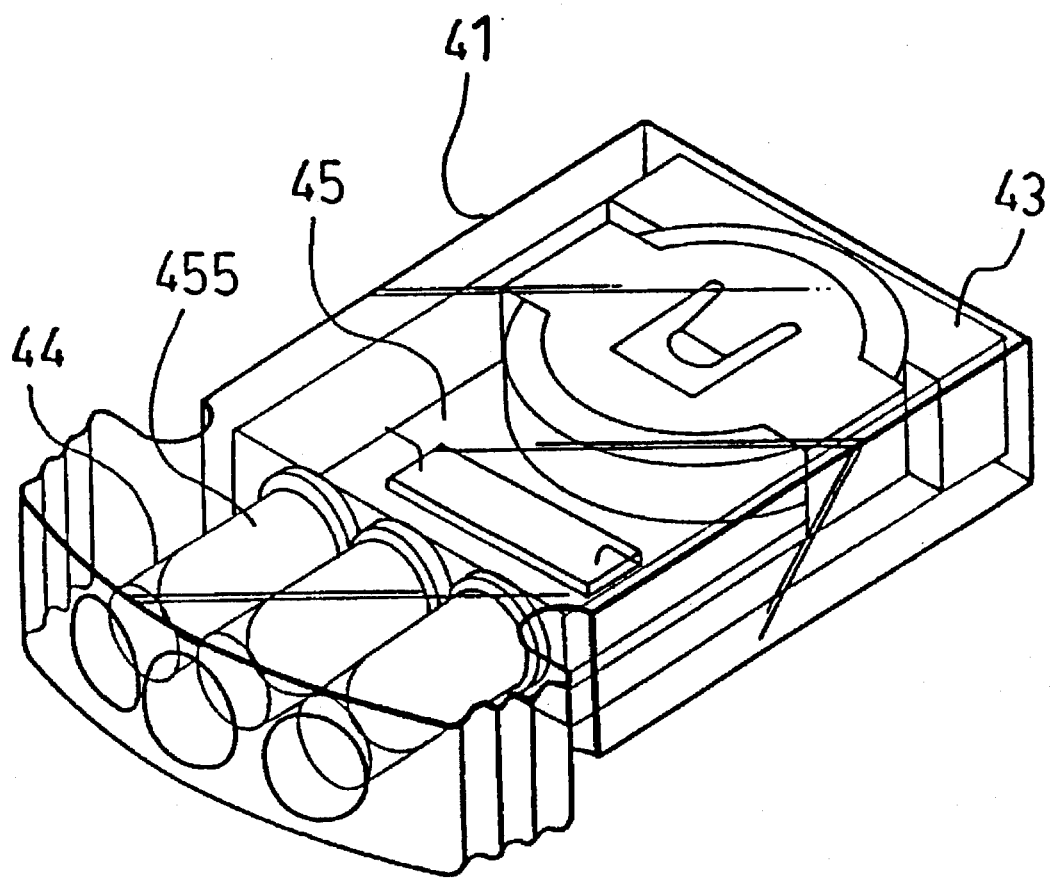
FIG. 5 is a perspective view of the warning signal control unit for the bicycle warning signal control device shown in FIG. 3.
Figure 6:
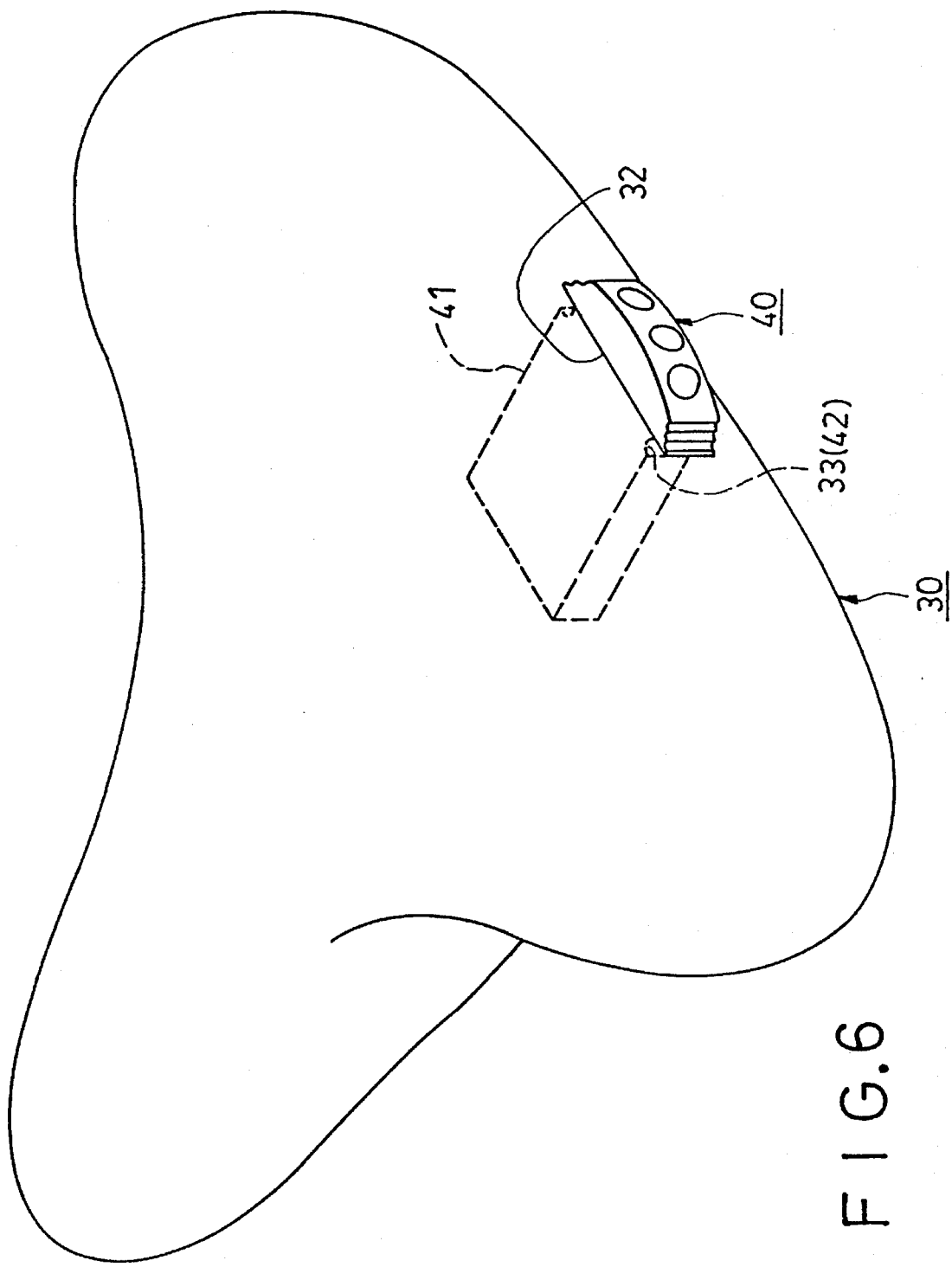
FIG. 6 shows the warning signal control unit of FIG. 5 installed in the saddle.

Referring to FIGS. 5 and 6, when the light emitting control circuit 45 is mounted within the casing 41 and the lamps 455 are respectively inserted into the lamp holes 44, the casing 41 is closed by the rear cover 43 (see FIG. 5).

When assembled, the alarm 40 is inserted into the mounting hole 32 on the saddle 30 and retained in position by the inward flanges 33 (see FIG. 6).

When the bicycle is moving, the saddle 30 with the alarm 40 will be oscillated, causing the vibration switch 452 intermittently switched on and off, and therefore the control IC 454 is drive to provide an output signal to the lamps 455 through the signal output legs L1, L2 and L3 intermittently, causing the lamps 455 alternatively and intermittently turned on and off. When the vibration switch 452 receives no vibration signal, the control IC 454 does no work, and the lamps 455 are turned off. The lithium battery cell of the DC power supply 453 is applicable for providing the necessary working voltage to the alarm 40 for about half year to one year under normal use. Furthermore, the number of the lamps 455 can be increased when the number of the signal output legs of the control IC 454 is relatively increased.

Figure 7:
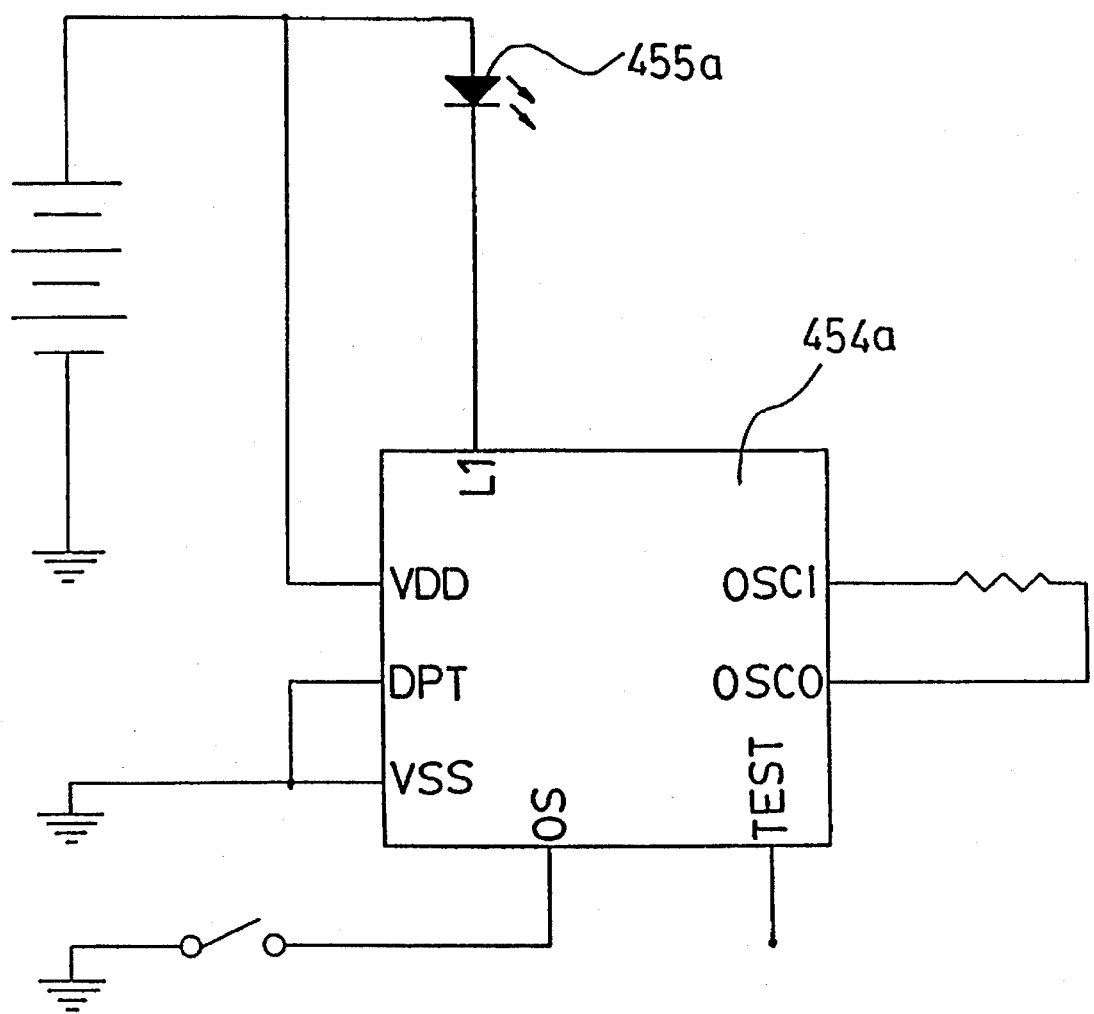
FIG. 7 is a circuit diagram of an alternate form of the light emitting control circuit according to the present invention.
Figure 8:
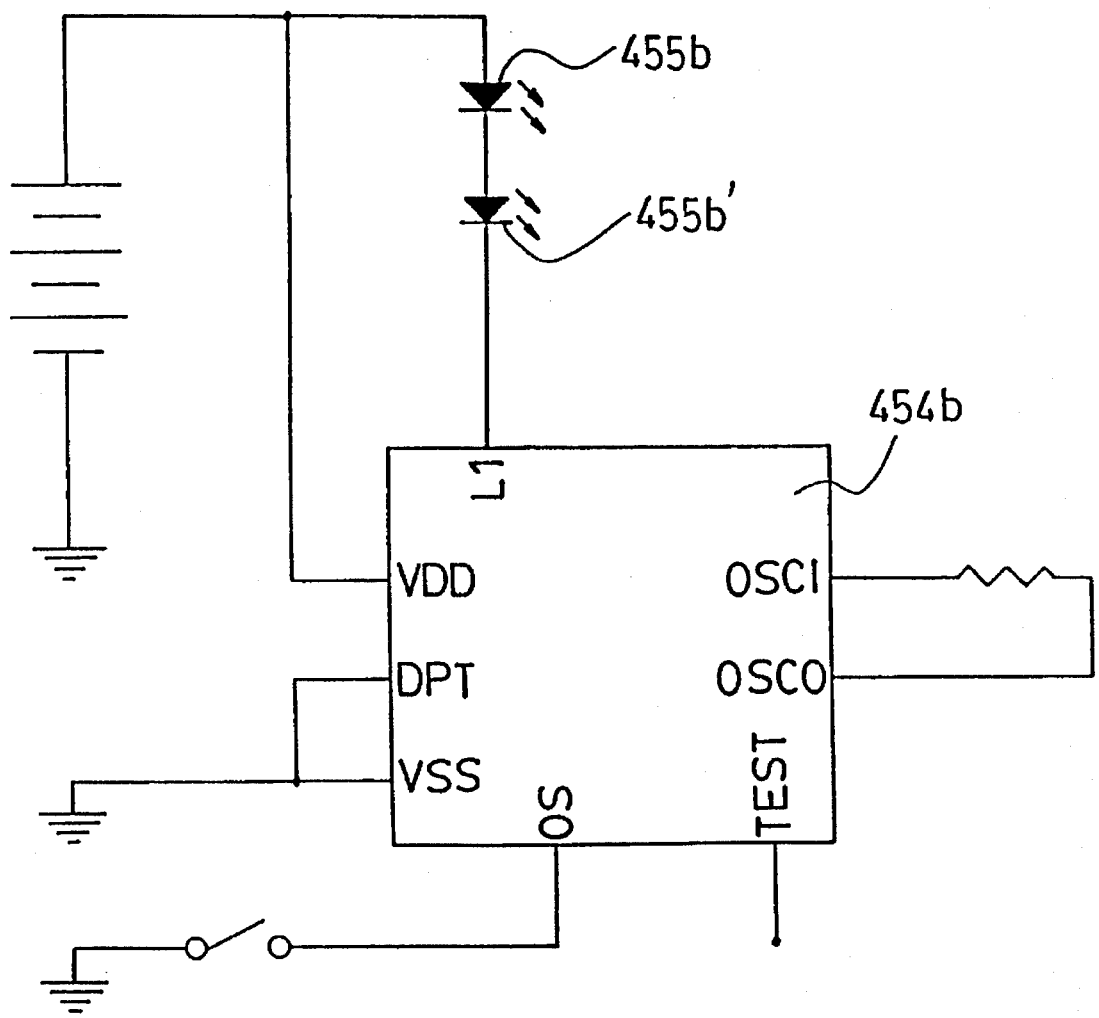
FIG. 8 is a circuit diagram of another alternate form of the light emitting control circuit according to the present invention.
Figure 9:
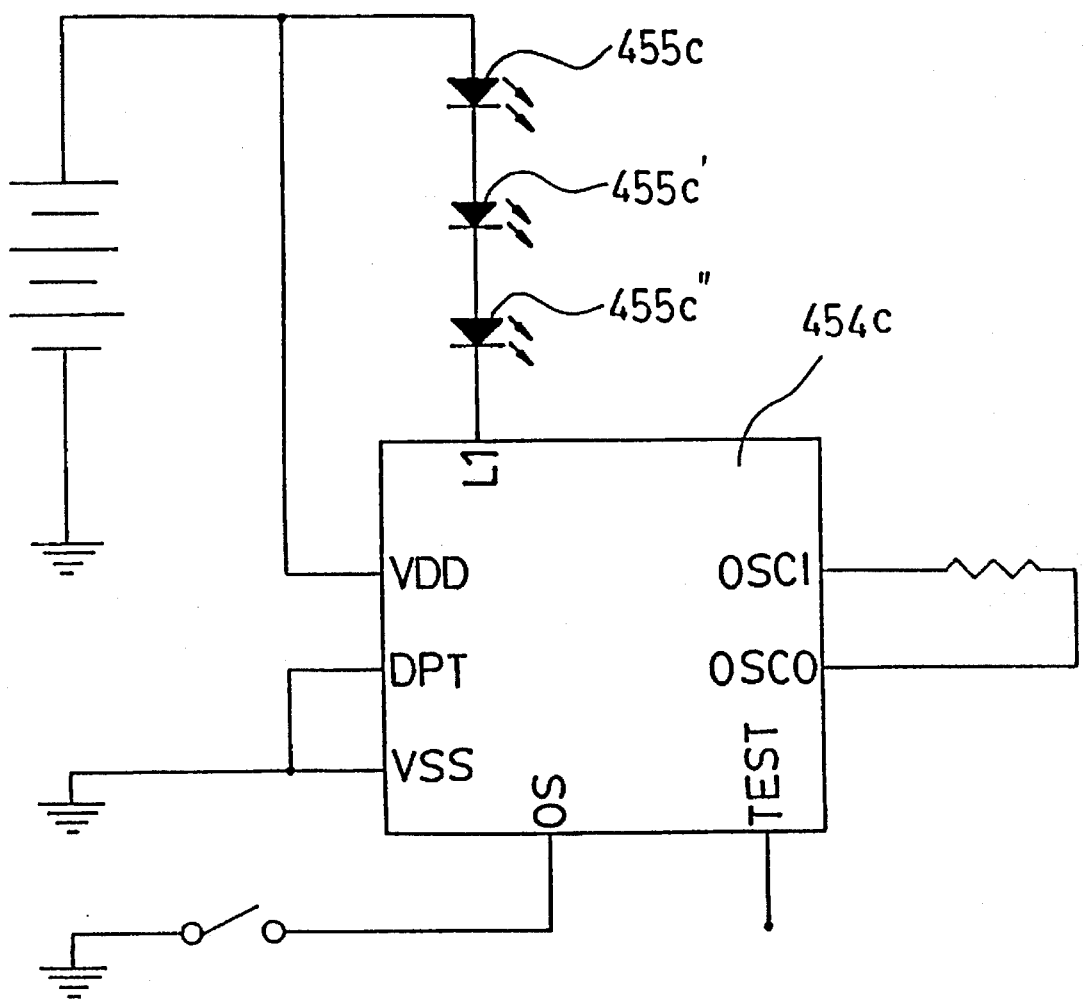
FIG. 9 is a circuit diagram of still another alternate form of the light emitting control circuit according to the present invention.
Figure 10:
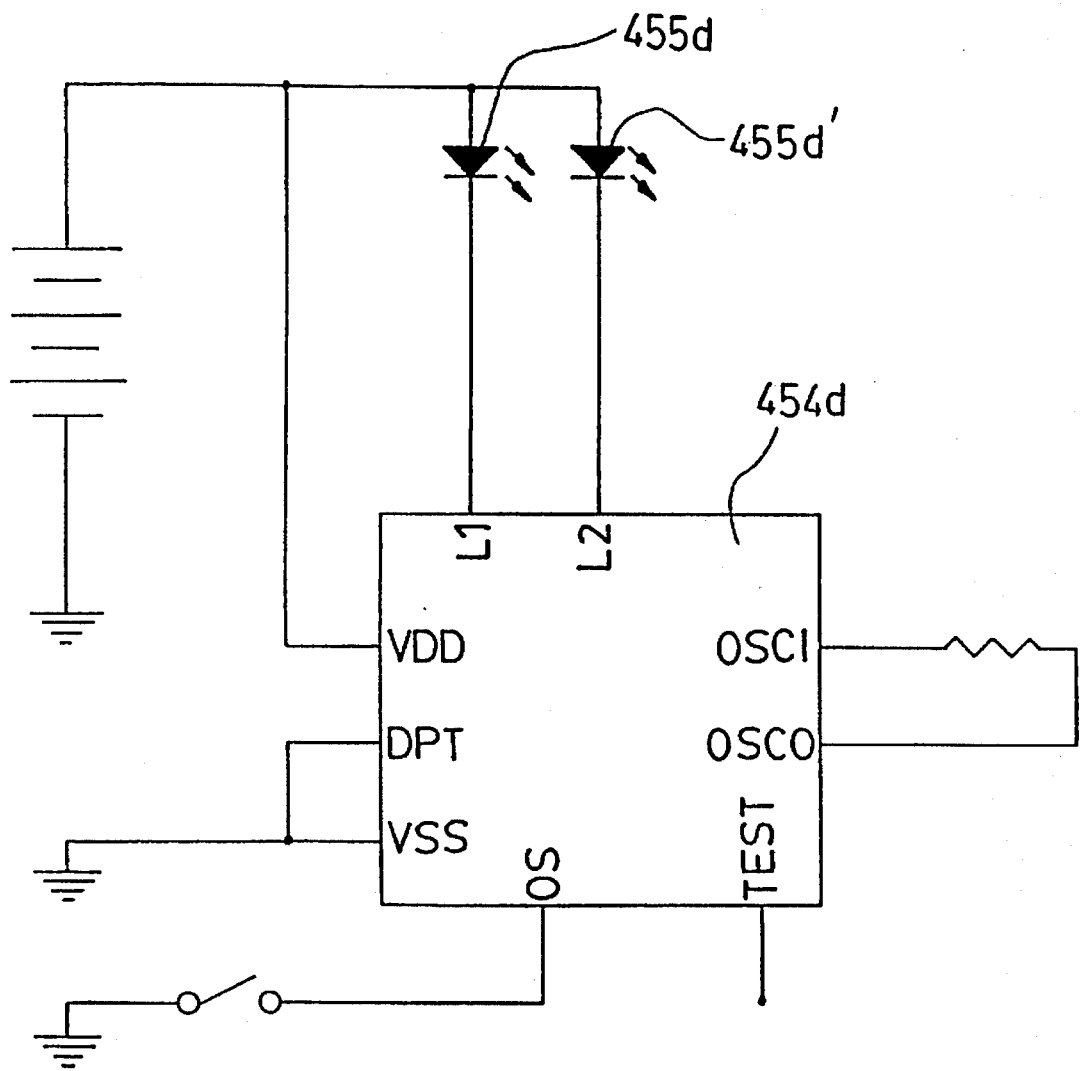
FIG. 10 is a circuit diagram of still another alternate form of the light emitting control circuit according to the present invention.
Figure 11:
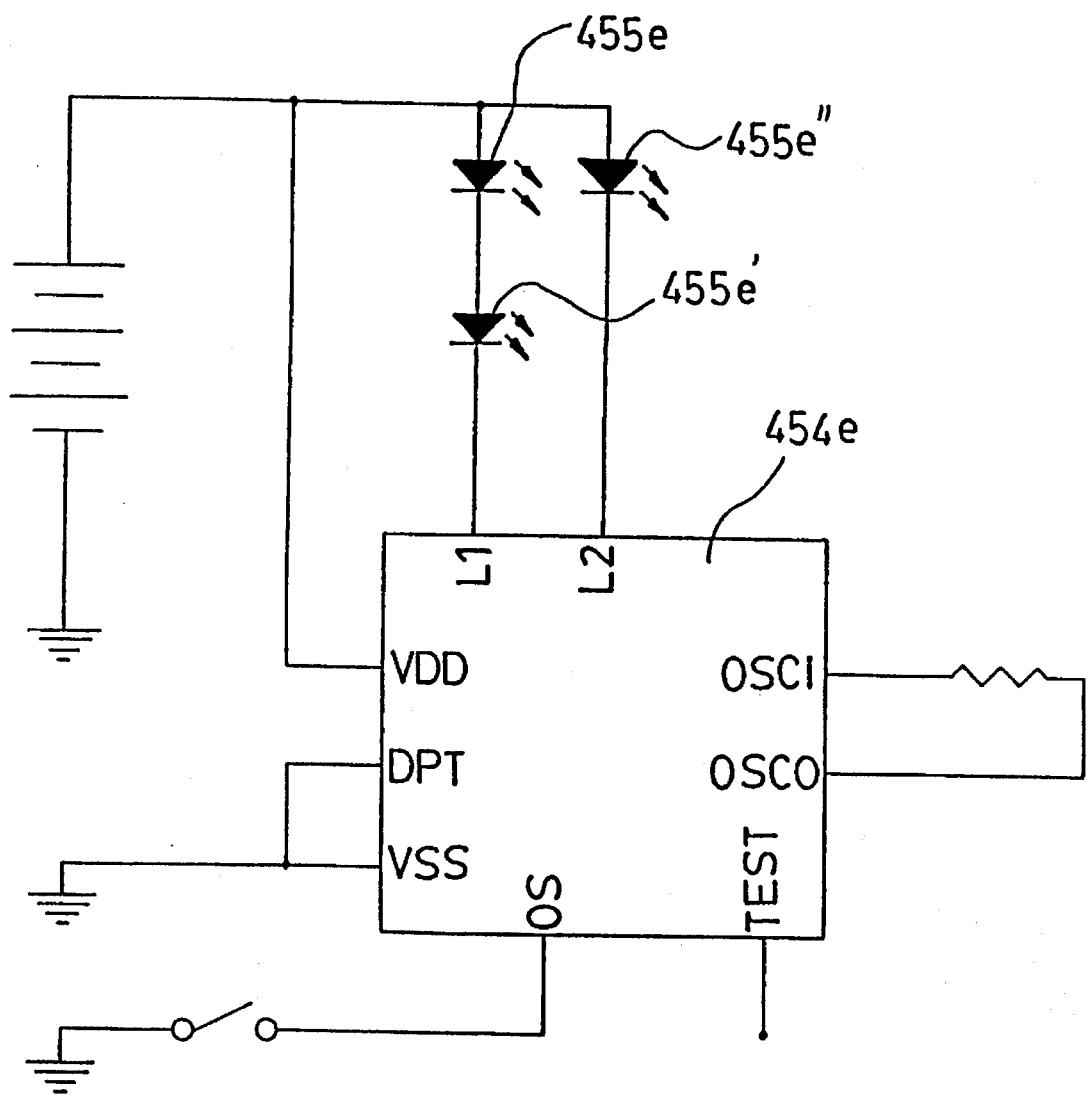
FIG. 11 is a circuit diagram of still another alternate form of the light emitting control circuit according to the present invention.

FIGS. 7 to 11 shows different flash control arrangements according to the present invention. In FIG. 7, the control IC 454a has a single signal output let L1, and one single lamp 455a is installed and connected to the signal output leg L1 of the control IC 454a. In FIG. 8, two lamps 455b and 455b' are connected in series to one signal output leg L1 of the control IC 454b, and the lamps 455b and 455b' are synchronously turned on and off when the vibration switch is vibrated. In FIG. 9, three lamps 455c, 455c' and 455c" are connected in series to one signal output leg L1 of the control IC 454c, and the lamps 455c, 455c' and 455c" are synchronously turned on and off when the vibration switch is vibrated. In FIG. 10, two lamps 455d and 455d' are respectively connected to two signal output lets L1 and L2 of the control IC 454d, and the lamps 455d and 455'd are alternatively and intermittently turned on and off when the vibration switch is vibrated. In FIG. 11, two lamps 455e and 455e' are connected in series to one signal output leg L1 of the control IC 454e and one lamp 455e" is connected to another signal output leg L2 of the control IC454e, therefore the lamps 455e and 455e' are synchronously turned on and off and the lamp 455e" is separately turned on and off when the vibration switch is vibrated.

Figure 12:
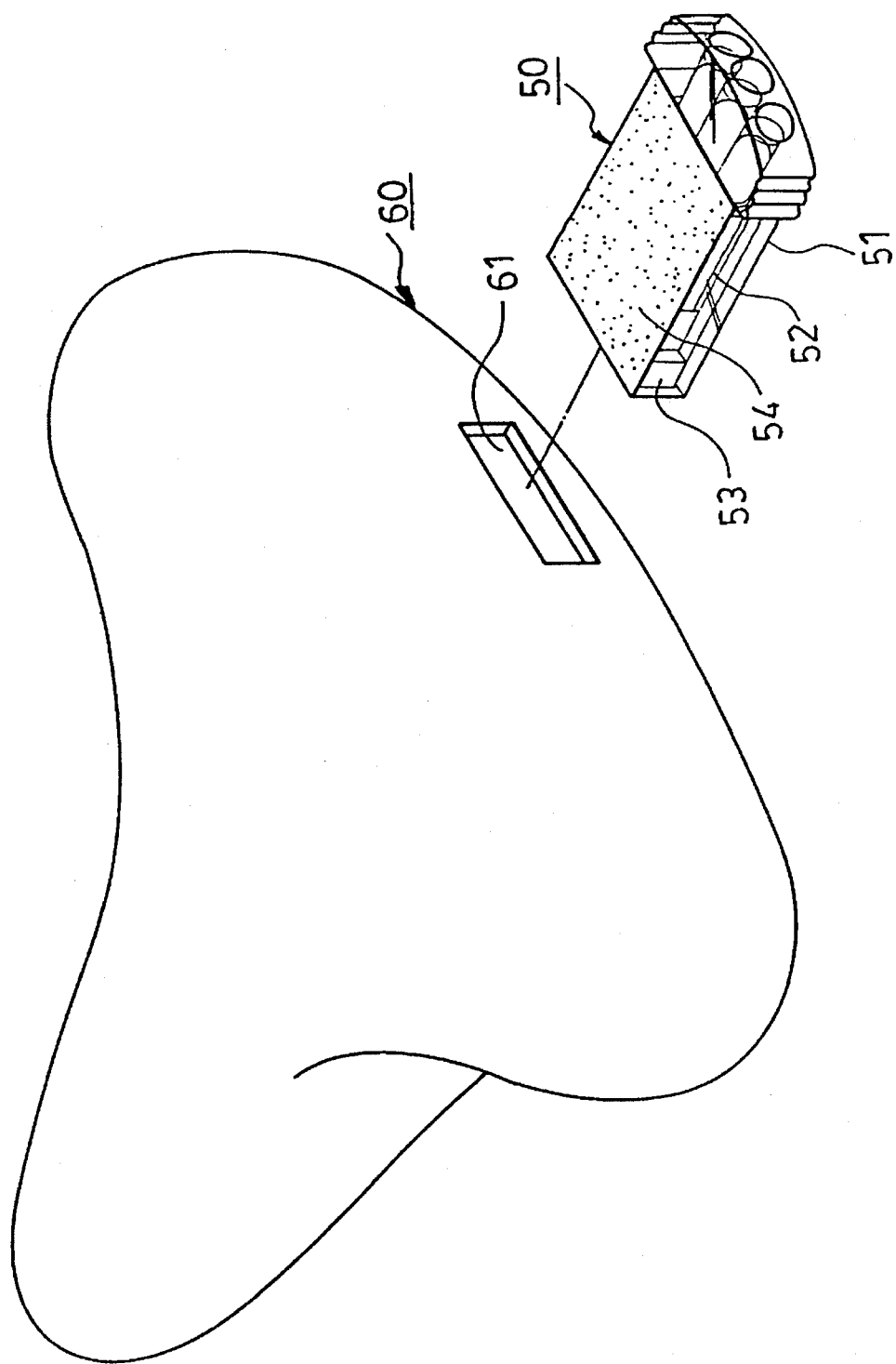
FIG. 12 shows another alternate form of the bicycle warning signal control device according to the present invention, in which the casing has a top side fixed with a double-sided adhesive tape.

FIG. 12 shows an alternate form of the bicycle warning signal control device of the present invention, in which the warning signal control unit 50 is mounted within a mounting hole 61 on the rear side of the saddle 60. Similar to the aforesaid first embodiment of the present invention, the warning signal control unit 50 is comprised of a casing 51 covered with a rear cover 53, and a light emitting control circuit 52 mounted inside the casing 51. The casing 51 has a top side fixed with a double-sided adhesive tape 54, which when the casing 51 is inserted into the mounting hole 61 on the saddle 60 is adhered to the bottom side of the saddle 60.

While only few embodiments of the present invention have been shown and described, it will be understood that various modifications and changes could be made without departing from the spirit and scope of the invention.

What is claimed is:

1. A bicycle warning signal control device for a saddle mounted on a bicycle, the saddle having a rear side and a hole on said rear side, a warning signal control unit mounted inside said hole and controlled to produce a flashing warning signal when the bicycle is moving, wherein said warning signal control unit comprises: a casing attached to the saddle and having at least one lamp chamber at a front side; a light emitting control circuit mounted within said casing, said light emitting control circuit comprising a circuit board, a vibration actuated switch mounted on said circuit board having a metal leaf spring, a DC power supply, a control integrated circuit connected to said DC power supply through said vibration switch, and at least one lamp respectively mounted in said at least one lamp chamber and controlled to give off light by said control integrated circuit whereby the vibration switch solely controls the electrical power supply to the control integrated circuit such that oscillation of the saddle causes the vibration switch to be intermittently switched on and off which, in turn, causes the at least one lamp to be intermittently turned on and off; two retaining holes at two opposite lateral sides of said casing; and two opposite inward flanges disposed at two opposite sides inside said hole of said saddle and respectively engaged into said retaining holes on said casing.

2. The bicycle warning signal control device of claim 1 wherein said casing has a top side and further comprising a double-sided adhesive tape fixed to said top side and adhered to a bottom side of said saddle when said casing is mounted in said mounting hole.

3. The bicycle warning signal control device of claim 1 wherein said integrated circuit has three outputs and further comprising one lamp connected to each output such that the lamps are alternately turned on and off.

4. The bicycle warning signal control device of claim 1 wherein said integrated circuit has a single output and further comprising a lamp connected to the single output.

5. The bicycle warning signal control device of claim 1 wherein said integrated circuit has a single output and further comprising a plurality of lamps electrically connected in series to the single output such that the plurality of lamps are synchronously turned on and off.

6. The bicycle warning signal control device of claim 1 wherein said integrated circuit has two outputs and further comprising at least one lamp electrically connected to each output such that the at least one lamp connected to each output is alternately and intermittently turned on and off.

7. The bicycle warning signal control device of claim 6 further comprising a plurality of lamps electrically connected to at least one output.

* * * * *